United States Patent Office 3,582,365
Patented June 1, 1971

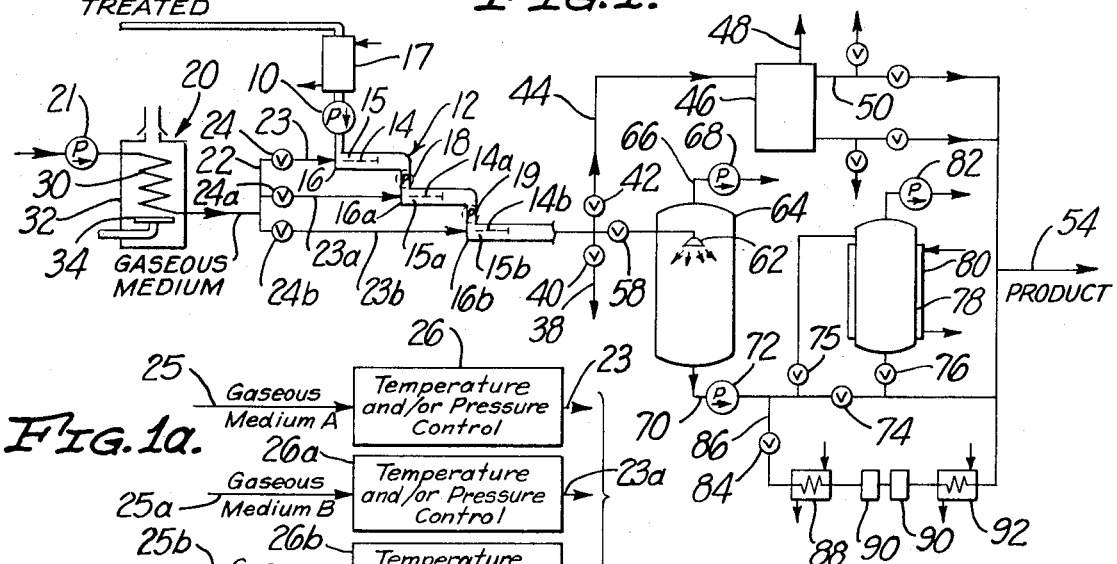
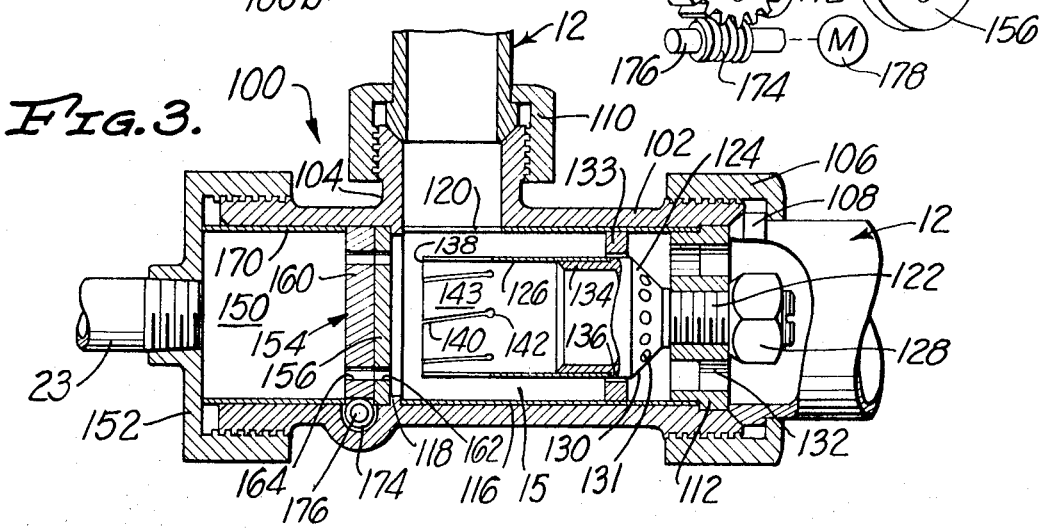

3,582,365
METHOD AND APPARATUS FOR TREATING MILK AND OTHER LIQUID PRODUCTS
Ernest E. Lindsey, Los Angeles, Calif., assignor to Food Enterprises, Inc., San Marino, Calif.
Continuation of application Ser. No. 702,329, Feb. 1, 1968. This application Apr. 27, 1970, Ser. No. 29,759
Int. Cl. A23c 3/02
U.S. Cl. 99—212
15 Claims

ABSTRACT OF THE DISCLOSURE

A process and apparatus for treating liquids by stagewise sonic mixing thereof with a gaseous medium (vapor or gas) used to vibrate a series of vibratory members spaced from each other along a laterally-confined flow path. Treatment may involve effecting chemical reactions between the liquid and the gaseous medium, sterilization of liquids, steam-washing of liquids and other effects. The resulting dispersions may be useful products or may be separated into their constituents.

---

This application is a continuation of my copending application Ser. No. 702,329, now abandoned.

In my Pat. No. 3,081,979 there is disclosed a sonic mixing apparatus and method whereby whipped cream substitutes or toppings that are stable dispersions are prepared in a single mixer having an annular vibratory member against the free end of which is directed a high-velocity jet of steam effective to vibrate the member. A stream of a mixture of water, sugar and vegetable or nut oils is introduced into the zone of the vibrating member to effect an extremely intense mixing and instantaneous heating of the components of the mixture, with the steam condensing in and augmenting the water content of the incoming mixture. If instead of steam a permanent gas is employed as the gaseous medium used to vibrate the member, the mixture will be aerated and the product will contain the permanent gas. If further mixing or augmentation of the water or gas component of the product is desired, the product may be recirculated through the same sonic mixing apparatus after passing through an additional piece of mixing equipment such as a spray tank where additional mixing is produced.

The amazing degree of mixing produced by such a sonic mixing apparatus and the ease with which such vegetable or nut oils can be aerated or augmented in water content to produce permanent emulsions or suspensions in the manufacture of toppings have been adequately demonstrated. However the process of my prior patent is limited in that the product is always a dispersion of augmented gas or water content. There is a need for processes and equipment capable of producing such extremely intense mixing effects while not requiring that the ultimate product contain the gas or the condensate of the steam used to vibrate the vibratory member. It is an object of the present invention to provide a process and apparatus by which a gaseous medium, whether it comprises largely a fixed gas or a vapor condensible into liquid state, can be used to vibrate one or more vibratory members, with the fixed gas, condensate or any residual vapors being moved to a desired extent from the product or being combined in different manner or amount with the product, all as a part of a continuous process.

In the treatment of various streams or substances using steam or any other hot gaseous medium to vibrate the vibratory member and effect the violent mixing resulting directly or indirectly from such vibration, it has been found that a single-stage mixing of this type may scorch or otherwise injure the substance to be treated. For instance, the heat-treatment of liquids such as milk for the purpose of sterilization and prolonging freshness for extended periods during storage is a typical example.

It has been found that stagewise heating in two or more mixers of the above type is advantageous in (a) avoiding the instantaneous and often too-severe heating needed in a single mixer of this type to obtain the desired temperature and mixing and (b) progressively or sequentially mixing the product and augmenting its content of condensate or gas, all whether or not some or all of the condensate or gas is removed from the product. It is an object of the invention to provide a process and apparatus of this nature.

The liquid substance to be treated by the invention may be a homogeneous liquid or solution, or mixtures or dispersions of the liquid-liquid, liquid-solid or liquid-gas type whether such liquid substances are of high or low viscosity. As the liquid in such mixtures predominates and is the continuous phase during treatment, all such systems are hereinafter referred to merely as liquids. If they involve mixtures it is sometimes the case that the dispersed phase may be or may contain a chemical substance reactive with the liquid of the continuous phase, in which event the process and apparatus of the invention can be used to facilitate or control the reaction in stages because of the intense mixing and reduction in particle size in each stage, because of the progressive dilution of the reactive substance as a result of the steam or other gaseous medium employed in each stage, and/or because of the heating that can be accomplished in each stage. In other instances the gaseous medium or some component thereof may be chemically reactive with the liquid substance to be treated or some component thereof. For example a fixed gas such as hydrogen can be employed to effect the vibration, being thereby brought into reactive contact with a liquid such as a vegetable oil in a hydrogenation process. Likewise a vaporized reactant such as the components of an acid or alkali solution may be used to effect the vibration, being thereby brought into reactive contact with and condensed in a liquid such as a mineral or vegetable oil containing an impurity or component reactive with acid or alkali.

In other instances the gaseous medium may exert purely a physical action on the liquid to be treated, e.g. one of washing, purifying, heating or chilling. By way of example, steam may be used to vibrate the vibratory members, being then condensed in situ into extremely small droplets of condensate that take up impurities or desirably-removed ingredients of the incoming liquid to be treated. The invention may also be used for biological purposes, as by using steam or sterilizing gases to kill microscopic organisms, bacteria, etc. in liquids. The sonic vibrations of the vibratory members also assist in this action.

The invention has among its objects the provision of processes or apparatus useful in accomplishing all such results and others. In these connections it should be understood that the invention is not concerned so much with specific substances or specific reactions as with a sequence of steps by which any one of a large number of actions or reactions can be effected in a manner much better than in existing practice.

Referring to the drawing, FIG. 1 shows diagrammatically the equipment of the invention as used in the practice of numerous processes of the invention. FIG. 1a shows an alternative arrangement for supplying gaseous media to the equipment of FIG. 1. FIG. 2 shows the preferred sequential mixers while FIG. 3 is an enlarged sectional view of one of these mixers and FIG. 4 is an exploded view illustrating the orifice plates of FIG. 3.

In the diagrammatic representation of the invention in FIG. 1 the liquid substance to be treated is forced by a pump 10 to flow forwardly along a laterally confined flow path, shown as the space inside a conduit 12. A plurality of base-mounted sonic vibratory members 14, 14a, 14b are disposed at spaced positions in the mixing zones 15, 15a, 15b along the flow path, preferably at points where there is a sudden change in forward flow direction, e.g. at bends 16, 16a, 16b where the conduit 12 bends or jogs. The liquid to be treated may be preheated or cooled before reaching the first bend 16, using any suitable heater, cooler or heat-exchange device 17 which may be on the intake or discharge side of the pump 10. Normally the pump 10 can be relied upon to force the liquid substance along the conduit 12, but auxiliary pumps 18, 19, suggested by dotted lines, can be employed between the stagees or the mixing zones 15, 15a, 15b.

A high-pressure stream of a gaseous medium is produced by a source 20, shown as fed by a pump 21, and is delivered to a manifold 22 where it is divided into a number of smaller streams corresponding to the number of sonic vibratory members 14. In FIG. 1 the individual pipes 23, 23a, 23b, preferably equipped with valves 24, 24a, 24b or other pressure control or flow control devices, deliver the smaller streams under high pressure respectively into vibrating relation with the sonic vibratory members 14, all in a manner to be described in greater detail.

In the alternative arrangement of FIG. 1a is shown a more generalized arrangement in which more than one gaseous medium can be employed. For example gaseous medium A can be from one source and can flow under pressure along a pipe 25 to any suitable temperature and/or pressure control 26 to the pipe 23 for delivery to the first mixing zone 15. The control 26 may be a controlled heating or cooling device acting to heat or cool a stream of a liquid or gas to produce the desired gaseous medium or it may be a valve or other pressure control device controlling the pressure and/or volume of the gaseous medium delivered to the mixing zone. Likewise the same or a different gaseous medium B can flow under pressure from a suitable source through a pipe 25a and through a suitable temperature and/or pressure control 26a to the pipe 23a for delivery to the second mixing zone 15a. In like manner gaseous medium C may be delivered under pressure from one of the foregoing sources or from an entirely different source to flow through a pipe 25b and a suitable temperature and/or pressure control 26b to the pipe 23b for delivery to the third mixing zone 15b. In each instance the corresponding gaseous medium will rapidly vibrate the corresponding sonic vibratory member. While the subsequent portions of the description will in most instances exemplify the invention as using the single-gaseous medium arrangement of FIG. 1 it should be clear that the arrangement of FIG. 1a with its different gaseous media separately controlled as to temperature and/or pressure can be utilized. In many practices of the invention this latter arrangement will be superior.

In all instances, the rapid vibration of the sonic vibratory members 14, 14a, 14b taken with the instantaneous condensation or collapse of vapors that may constitute or be a part of the gaseous medium will induce extremely intense mixing actions adjacent the bends 16 as concerns all process materials existing in the corresponding mixing zone. The mixing is the result of extreme cavitation effects produced by the sonic vibratory members. These cavitation effects are augmented if the gaseous medium is or contains a vapor that percussively collapses upon condensing in the liquid in the corresponding mixing zone. Some of the mixing actions are explained more fully in my prior patent, mentioned above.

The source 20 of FIG. 1 or each of the respective sources of FIG. 1a may be any source generating or delivering the desired gaseous medium under pressure. If steam alone is to be used as the gaseous medium, such a source may be any conventional boiler or source of saturated steam. As shown in FIG. 1 the source 20 includes a pipe coil 30 in a housing 32 with a burner 34 heating the coil and the material forced therethrough by the pump 21. This pressured material is thus caused to flow along an elongated laterally-confined passage within the pipe coil and is progressively heated at progressively reducing pressures during the flow therealong. If the pressured material is a liquid, it can be partially or wholly vaporized during such flow and any unvaporized portion or any solids in the liquid can be maintained in uniform suspension during or after the heating, all as a result of turbulence in the filamentary stream being thus heated or conditioned in the pipe coil. Likewise any chemical solution can be heated during turbulent flow along a pipe coil or any other elongated laterally-confined passage and its liquid component partially or completely vaporized. In other instances, however, the source 20 of FIG. 1 or any of the sources used with the equipment of FIG. 1a may be merely a source of fixed gas in gaseous or liquified state. A change in temperature and/or pressure may or may not be desired prior to discharge into the respective mixing zones 15, 15a or 15b.

In many practices of the invention, the gaseous medium introduced into a mixing zone will be or may contain a vapor; also the temperature of the liquid in each mixing zone 15 receiving such a gaseous medium will be sufficiently cooler to cause condensation of part or all of the vapor. In this instance the condensate will usually appear as minute droplets suspended in the body of the liquid being treated. In FIG. 1 the temperature of the liquid will be progressively increased as it passes through the mixing zones 15, 15a, 15b due to contact with the increments of hot gaseous medium employed to vibrate the vibratory members and effect the sonic mixing. At the same time, and in the absence of interstage pumping the pressure along the conduit 12 will progressively decrease, albeit there may be violent oscillatory changes in pressure in each mixing zone as a result of the vibrations of the vibratory member therein. This combination of progressive or stepwise heating under pressure conditions that fluctuate transiently but generally decrease toward the exit end of the conduit 12 is often of great significance in the treatment of various liquids or the production of various products.

The liquid stream issuing from the conduit 12 will sometimes be a dispersion of the type in which a condensate is dispersed in the liquid that is pumped into the conduit or in the liquid as modified in the process. If this dispersion is the product desired from the invention, it can be withdrawn from the equipment through a pipe 38 having a valve 40.

On the other hand it is often desired that the product produced by the invention should not be such a dispersion and that any dispersion thus formed should be separated into its constituents. In this instance a valve 42 in a line 44 leading to any known separation equipment 46 can be opened. Any separated gaseous constituent can then be withdrawn at 48, a lighter liquid at 50 and/or a heavier liquid at 52. Either the lighter or heavier liquid may be the ultimate product and may be withdrawn from the system or conducted to a product line 54 through the valving shown. The dispersion can be gravitationally separated in the separation equipment 46 in any known way. Such separation can be facilitated by well-known aids such as the employment of heat, pressure, centrifugal forces, chemical agents, electrical actions, etc.

One way of removing such a condensate from a dispersion is to flash it into vapor and separate the vapor, leaving a liquid product. If this action is desired a valve 58 can be opened to deliver the dispersion to an expansion zone or directly to a spray nozzle 62 of a flash tank 64. Vapors flashing from the stream can be removed through line 66 and a pump 68 may be used to aid this withdrawal or to reduce the pressure in the flash tank to aid in the flashing. The separated liquid, now containing little or none of the condensate, may be moved along a line 70 by a pump 72 to the product line 54. If further separation of condensate is desired, a valve 74 can be closed and valves 75 and 76 opened to cause the liquid to be moved into a tank 78 where heat may be applied by a jacket 80 and where a vacuum may be created by a vacuum pump 82.

In some instances, as in the processing of milk, it is desirable that the liquid in the line 70 be homogenized under controlled temperature conditions. In this instance the valve 74 may be closed and a valve 84 in line 86 opened to deliver the stream to a heat exchanger 88 and thence to one or more homogenizers 90. The resulting homogenized liquid can be cooled in a heat exchanger 92 before being discharged through the product line 54.

The mixing zones 15, 15a, 15b and associated equipment are shown diagrammatically in FIG. 1 and more in detail in FIG. 2. In practice, the mixing zones are respectively within mixers 100, 100a, 100b connected to elements of the conduit 12 by pipe fittings. The construction will be apparent from FIG. 3 which shows in detail the preferred construction of the mixer 100.

Referring to FIGS. 2, 3 and 4, each mixer includes a tubular housing 102 threaded or otherwise connected at opposite ends and having a side fitting 104 opening laterally on the mixing zone 15 within the tubular housing. A section of the conduit 12 is joined to the righthand end of the tubular housing 102 by a gland 106 which may engage a shoulder of a beveled flange 108 of the conduit and press it against a corresponding beveled face of the tubular housing in fluid tight relation. In like manner another section of the conduit 12 may be secured by a gland 110 to the side fitting 104, forming an inlet for the mixing chamber 15.

The gland 106 at the exit end may be used to force a shouldered spider 112 against an internal shoulder of the tubular housing to serve as a mount for the vibratory member to be described. Likewise the shouldered spider 112 may engage one end of a sleeve 116 and press the other end thereof against an annular shoulder 118 of the tubular housing. The sleeve 116 bounds the mixing chamber 15 and has an opening 120 registering with the interior of the side fitting 104.

The spider 112 has an opening receiving a threaded shank 122 of a base member 124 supporting a vibratory member 126 that is exemplary of the vibratory member 14 previously described. A nut 128 threaded to the shank 122 seats a shoulder at the base of the shank against the spider 112. A diverging portion 130 of the base member 124 provides openings 131 for exit of mixed material from within the vibratory member 126. Mixed material from the space around the vibratory member 126 will join the mixed material from within this member and exit through openings 132 of the spider 112. To minimize flow of the mixed material through the space around the vibratory member, this space may be partially blocked by a ring 133.

The vibratory member is desirably tubular with its rear end telescoping over and fixed to a tubular extension 134 of the base member 124 and abutting a shoulder 136 thereof. The vibratory member 126 is thus rigidly mounted at its base with a major portion of the length of the vibratory member 126 extending forward from the base member 124 and being mounted in cantilever fashion for vibration. This cantilevered portion may be of uniform thickness but it is often preferable to taper it in thickness with the thickest portion being toward the base member 124. In all instances the vibratory member 126 terminates in a forward annular edge or lip 138 which is quite thin but which may be, if desired, in the form of an annular bead.

If desired short slots 140 may be cut into the forward end of the vibratory member 126. Such slots are preferably cut helically to extend at an angle of about 2–30° from a longitudinal line parallel to the axis of the vibratory member. The rear portion of each slot 140 can terminate in a small opening 142 for stress distribution. It should be understood however that the slots 140 are not essential to the operation of the invention. If used, they divide the forward end of the vibratory member into reed-like vibratory elements 143 that vibrate in an in-out direction as disclosed in my patent supra. The vibratory length of the reed-like portions is made longer relative to the axial length thereof by use of the helically cut slots. If the slots 140 are not used, the annular end of the vibratory member will still vibrate in an in-out direction, the vibratory pattern involving transient deviations from circularity to oval form in different radial planes at different times as disclosed in my patent supra. In all instances vibration is effected by jetting the gaseous medium at high velocity against the end portion of the vibratory member by means now to be described.

The gaseous medium under high pressure enters an inlet or supply chamber 150 at the left end of the tubular housing 102. As shown, the exemplified pipe 23 is secured to a cap 152 threaded or otherwise secured to the corresponding end of the tubular housing. An adjustable nozzle means 154 is disposed between the supply chamber 150 and the mixing chamber 15 and serves to jet the gaseous medium at extremely high velocity toward the free end of the vibratory member 126 to vibrate same. The nozzle means 154 acts as an adjustable valve and may take the place of or supplement the valve 24, 24a, 24b of the FIG. 1 embodiment or any pressure control effected by the control unit 26, 26a, 26b of FIG. 1a. While the adjustable nozzle means 154 may be constructed and controlled as described in my patent supra to deliver an annular jet of gaseous medium toward the free end of the vibratory member 126, a preferred construction of the adjustable nozzle means is shown in FIGS. 3 and 4. This adjustable nozzle means is capable of delivering a large number of high-velocity jets of the gaseous medium arranged in a circular pattern corresponding to the size and shape of the annular edge or lip 138 of the vibratory member 126.

Referring to FIGS. 3 and 4, a stationary orifice plate 156 is suitably locked against rotation in the tubular housing 102 and is positioned by engagement with the annular shoulder 118. In face-to-face contact therewith is an adjustable orifice place 160 mounted to turn through a small angle relative to the orifice plate 156. The stationary orifice plate 156 includes a large number of small holes 162, exaggerated in size in FIGS. 3 and 4 for clarity, these holes being drilled in a circular pattern with the diameter of the circle being substantially the same as the diameter of the free edge or lip 138 of the oscillatory member 126. The adjustable orifice plate 160 has a corresponding number of holes 164 which can be brought into exact registry with the openings 162 if maximum size jets of the gaseous medium and minimum throttling thereof is desired. However if the adjustable orifice plate 160 is turned through a minute angle one way or the other from this registry position the holes 164 will be slightly out of alignment with the holes 162 and all of the jets of gaseous medium can be simultaneously made smaller. It is thus possible to control simultaneously the velocity and volume of the large number of jets of gaseous medium directed to the free end of the vibratory member 126. The holes 162 and 164 are preferably drilled parallel to the axis of the vibratory member but they can be drilled at a small angle thereto so that the resulting jets are directed angularly toward the free end of the vibratory member 126.

The adjustable orifice plate 160 is held in face-to-face contact with the stationary orifice plate 156 by one end of a sleeve 170. Th other end of this sleeve may be engaged by the cap 152 to provide adjustment of the space in which the adjustable orifice plate 160 turns. This orifice plate 160 can be peripherally journaled inside the tubular housing 102 and confined against lateral movement by the stationary orifice plate 156 on one side and the end of the sleeve 170 on the other side.

Turning of the adjustable orifice plate 160 can be effected manually or by a motor control. As best shown in FIGS. 3 and 4 a lower sector of the adjustable orifice plate 160 may be provided with gear teeth 172 meshing with a worm gear 174 on a shaft 176 suitably journaled in the tubular housing 102. This shaft 176 can be turned manually by a hand wheel or crank. Preferably however it is connected to a reversible electric motor 178 permitting control of the adjustable nozzle means 154 of the various mixers from a remote control panel.

In operating the equipment of FIG. 1 equipped with the mixers of FIG. 3 the conduit 12 is first filled with the liquid to be treated or with some other liquid before the valves 24, 24a, and 24b or the adjustable nozzle means 154 are opened. The high-velocity impingement of the gaseous medium on the free ends of the vibratory members 126 will effect vibration thereof, usually at frequencies that are in the ultrasonic range or in the upper end of the audible range, depending in large part upon the free period of vibration of the vibratory member and the velocity of the impinging jets of gaseous medium. The liquid substance to be treated will come into contact with the gaseous medium in the zone around and at the forward end of the vibratory member and intense instaneous mixing will take place. This mixing is the result of the extreme cavitation effects produced by the vibration of the vibratory member, augmented by cavitation effects attendant upon the percussive collapse of vapors as they condense, assuming that the gaseous medium contains such vapors. The extreme rapidity of the mixing and treatment will be evident from the fact that the materials are in the three multiple-mixer units for only a matter of seconds, usually from a fraction of a second up to 12 seconds with the residence time in each mixer being in the neighborhood of .01–.8 second.

The process and apparatus of the invention are excellently adapted to the sterilization of raw milk to produce an aseptic product that can be stored in sealed sterilized containers of glass, plastic or metal without refrigeration for months and often for years without deterioration. The canned product has the taste of fresh milk and contains all of the components thereof. The bacteria count of milk processed in accordance with the invention and stored for many months at ambient temperature has been found to be nil. The process is not one merely of pasteurizing milk but actually sterilizing it as a result of contact with saturated steam at a minimum pressure of about 60 p.s.i.g. and a minimum temperature of about 285° F. The flavor and quality far surpasses those of condensed milk that is sterilized by heating after canning in metal containers.

By way of example, raw milk at room temperature or below, or optionally preheated to about 160° F., can be pumped through the three-mixer equipment illustrated, with the mixers being joined by 1.5" conduit sections. The milk may flow at a rate of about 500 gal./hr. with the exit pressure at the pump 10 being about 60–70 p.s.i.g. Saturated steam at about 90–140 p.s.i.g. (about 331–361° F.) and preferably near the upper ends of such ranges will be supplied to the manifold 24. This steam will be jetted into the first mixer 100 as controlled by the valve 24 and/or the adjustable nozzle means 154 of this mixer. With milk preheated to 160° F., the steam flow will be regulated to produce a milk product exiting from the first mixer at a temperature of about 220–230° F., assuming the use of steam at a pressure of about 140 p.s.i.g.

A second increment of steam at the same temperature will be similarly controlled by the corresponding valve 24a and/or the corresponding adjustable nozzle means 154. This steam will further heat the milk and condense therein in the second mixer and the steam flow will be regulated to produce a milk product exiting from the second mixer at about 240–260° F. A third increment of the steam at the aforesaid temperature and similarly controlled will contact and heat the milk and condense therein in the third mixer. The steam flow will be controlled so that the exit temperature from the third mixer will be about 287–300° F. The milk will typically be at a pressure of about 60 p.s.i.g. in the exit end of the conduit 12. If the milk is not preheated, exit temperatures from the three stages may often be controlled to be in the range of 160–220° F. from the first stage, 220–260° F. from the second stage and 260–287° F. from the third stage.

The exiting product has been diluted by the small amount of condensate therein. In some instances such a diluted milk is saleable and can be cooled and discharged through the line 38. Preferably however, some or all of the condensate is removed by opening the valve 58 and delivering the milk to the flash tank 64. The pump 58 usually is not needed as the milk will still be at a pressure high enough to deliver it to the flash chamber without additional pressurization. The pressure in the tank 64 can be maintained at about 2 p.s.i.g., the vapors flashing from the milk being removed through the line 66. Typically, this flashing will reduce the temperature of the milk to about 215° F. The milk in the line 70 is then further cooled in the tank 78 where additional condensate may be removed by flashing. In the tank 78 the milk may be made to flow along the tank wall to facilitate removal of vapors or to facilitate cooling if the tank is cooled by external water jets or by a cooling medium circulated through the jacket 80. The milk is then moved through the product line 54 to an aseptic canning station where it is canned or bottled under aseptic conditions.

In another and often preferable operation used to produce a homogenized milk, the milk exited from the conduit 12 at a temperature of about 287° F., and a pressure of about 60 p.s.i.g. In this instance the milk was delivered from the conduit 12 into a slightly larger tube, which may be of a diameter of about 4" when using a conduit 12 of 1.5" diameter, and then to the flash tank 64 where the pressure was about 2 p.s.i.g. and the temperature about 215° F. The milk in line 70 was then pumped into the heat exchanger 88 for cooling, e.g. to about 160° F., and was then delivered to two homogenizers 90 of the triplex pump type. In such a two-homogenizer operation employing triplex pumps, the pressure in the first and second homogenizers may be about 2,000 p.s.i.g. and about 400 p.s.i.g. respectively. The milk was then cooled in the heat exchanger 92 to room temperature or below, e.g. to a temperature of 50° F., and delivered to an aseptic canning station through the product line 54.

In contrast to the above, attempts in other ways to heat the milk to a temperature of 287–300° F. will result in carmelizing, scorching and changing the flavor of the product. If attempts are made to use a single mixer 100, instead of a plurality thereof, the high temperature steam needed to raise the product temperature to 287° F. will likewise scorch the milk and deteriorate it. However by use of the invention the milk is completely sterilized without carmelizing or scorching and the flavor and keeping qualities of the resulting product are unique and heretofore unknown. This is the result of the progressive heating and progressive augmentation of the condensate component of the milk, all during processing at progressively lower pressures in the several mixing zones.

It will be understood that the foregoing examples are merely exemplary of uses of the process and equipment of the invention. It will be apparent that the invention is useful in a wide variety of instances where chemical reactions, sterilization, cleaning or other processing of liquids is desirable, particularly where such processing is to involve extremely intimate and rapid mixing of a gaseous medium with the liquid to be treated.

I claim:

1. Apparatus for the rapid progressive treatment of a liquid, said apparatus including in combination:
   (a) a conduit having spaced mixing zones therealong, said conduit having entrance and exit ends;

(b) means for flowing a stream of said liquid rapidly through said conduit and with the pressure in said stream reducing during such flow;

(c) a base-mounted vibratory member projecting in each mixing zone with each member having a free end, (d) orifice structure in the path of the flow for restricting the flow passage from said mixing zones; and (e) means for supplying to each mixing zone a high velocity jet of a gaseous medium directed toward the free end of the vibratory member therein to set said vibratory member into rapid vibration and effect instantaneous sonic mixing of the liquid and the gaseous medium entering each mixing zone, thereby progressively producing a mixed product.

2. Milk treating apparatus, comprising (a) means including a series of chambers flowing milk in a confined stream, said chambers having exit orifices operating to restrict milk passage from the chambers;

(b) means jetting hot pressurized auxiliary fluid into the milk in said chambers to locally heat the milk therein so as ultimately to raise the milk stream temperature to a resultant level in excess of 250° F.; and (c) vibratory means in said chambers and responsive to impingement of said jetted auxiliary fluid to vibrate and effect localized violent mixing of the milk and auxiliary fluid within said chambers prior to passage of the milk from said chambers.

3. Apparatus as defined in claim 2 wherein said auxiliary fluid comprises steam, and including means controlling the rate of steam jetting into said milk to heat the milk to progressively higher temperatures in successive chambers.

4. Apparatus as defined in claim 3 including separator means connected to receive the mixed milk and water formed upon steam condensation and to flash evaporate water at reduced pressure.

5. Apparatus as defined in claim 4 including homogenizer means connected to receive and homogenize milk from which water has been flash evaporated.

6. Apparatus for the rapid progressive treatment of a liquid, said apparatus including in combination:

(a) a conduit having spaced mixing zones therealong, said conduit having entrance and exit ends;

(b) means for flowing a stream of said liquid rapidly through said conduit from said entrance end to said exit end with the pressure on said stream progressively reducing during such flow;

(c) a base-mounted vibratory member in each mixing zone, each vibratory member having a free end and being mounted in the path of flow of said liquid; and (d) means for supplying to each mixing zone a high velocity jet of a gaseous medium directed toward the free end of the vibratory member therein to set said vibratory member into rapid vibration and effect instantaneous sonic mixing of the liquid and the gaseous medium entering each mixing zone, thereby progressively producing a mixed product, said geasous-medium supply means includes at least one source of gaseous medium under high pressure, a plurality of pipes corresponding in number to the number of said mixing zones and connected to said gaseous supply means, each pipe communicating with a nozzle means in a corresponding mixing zone forming said high velocity jet, and means for separately adjusting the amount of gaseous medium contained in each of said jets that vibrate said vibratory members, the free end of each vibratory member being annular, and each nozzle means including a stationary orifice plate having a large number of orifices arranged in a circular pattern corresponding in diameter to the diameter of said annular end of a corresponding vibratory member with said orifices being directed toward such annular end, and a rotatable orifice plate in face-to-face relationship with said stationary orifice plate with a corresponding number of orifices registering with said first-named orifices when said orifice places are relatively in one fully-open orifice position and being peripherally disaligned from such first-named orifices when said orifice plates are relatively in a full-closed orifice position, said jet adjusting means including said rotatable orifice plate between said orifice positions.

7. A process for treating liquids by use of at least two mixing zones each with an annular base-mounted sonic vibratory member capable of producing extremely intense sonic mixing and cavitation effects when vibrated, each mixing zone having a corresponding supply chamber adjacent thereto, which process includes the steps of:

(a) flowing the liquid to be treated sucessively through said mixing zones under pressure;

(b) supplying to each supply chamber at a pressure higher than the pressure in the corresponding mixing zone a stream of a gaseous medium, and throttling such gaseous medium during flow into the corresponding mixing zone to form a high-velocity jet directed toward the end of the corresponding sonic vibratory member, said jet acting to vibrate the member at high frequency in the mixing chamber to mix the liquid and the gaseous medium by sonic and cavitation effects, producing a mixed liquid; and (c) restricting mixed liquid flow from said mixing zones zones by subjecting the liquid flow to passage through orifices at the ext sides of said zones.

8. A process as defined in claim 7 in which the liquid to be treated is pressured ahead of the first mixing zone and delivered under pressure thereto, and in which the pressure in the successive mixing zones is progressively lower, the mixed liquid flowing from a mixing zone to a succeeding mixing zone under the pressure of the pressured liquid delivered to the first of the successive mixing zones.

9. A process as defined in claim 7 including the step of continuously processing the mixed liquid from the last mixing zone to separate a component thereof and produce a stream of a product.

10. A process as defined in claim 7 in which each stream of gaseous medium is at a temperature higher than the temperature of the liquid stream entering the corresponding mixing zone whereby the liquid to be treated is successively heated as it flows through said zones.

11. The process of treating milk using vibratory members, that includes:

(a) flowing the milk in a confined stream through a series of mixing zones, (b) restricting existing of the milk from said zones, (c) jetting hot pressurized auxiliary fluid into the milk in said zones to locally heat the milk therein so as ultimately to raise the milk stream temperature to a resultant level in excess of 250° F., and (d) subjecting the milk in said zones to intense sonic mixing and cavitation effects product as a result of impingement of said jetted auxiliary fluid against the vibratory members proximate said zones causing vibration of said members.

12. The process of claim 11 wherein said auxiliary fluid comprises steam, and including the step of controlling steam jetting into said zones to heat the milk to progressively higher temperatures in successive mixing zones.

13. The process of claim 12 including the step of separating from the milk water that is formed by a steam condensation, said separation being carried out following said mixing in said zones and at reduced press to flash evaporate said water and to reduce the milk temperature.

14. The process of claim 13 including the step of homogenizing said milk following said separation step.

15. The process of claim 12 wherein said controlling step is carried out to effect heating of the milk in a first zone to between 160° F. and 230° F., heating of the milk in a second zone to between 220° F. and 260° F., and heating of the milk in a third zone to between 260° F. and 287° F.

References Cited

UNITED STATES PATENTS

| | | | |
|---|---|---|---|
| 1,789,738 | 1/1931 | Gane | 99—251X |
| 1,863,222 | 6/1932 | Hoermann | 259—S.V. |
| 2,846,320 | 8/1958 | Wittwer | 99—251X |
| 3,081,979 | 3/1963 | Lindsey | 261—78(.1)X |
| 3,278,165 | 10/1966 | Gaffney | 259—1 |
| 3,289,569 | 12/1966 | Frolich | 99—251 |
| 3,357,683 | 12/1967 | Frykhult | 259—1X |

TIM R. MILES, Primary Examiner

U.S. Cl. X.R.

99—216, 251; 259—1